(12) United States Patent
Trout

(10) Patent No.: US 9,973,670 B2
(45) Date of Patent: May 15, 2018

(54) ELECTRONIC APPARATUS WITH AN IMPROVED BEARING FOR A CONNECTING UNIT, CAMERA SYSTEM FOR A MOTOR VEHICLE AND MOTOR VEHICLE

(71) Applicant: Connaught Electronics Ltd., Galway (IE)

(72) Inventor: Shane Trout, Galway (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 37 days.

(21) Appl. No.: 15/102,752

(22) PCT Filed: Oct. 15, 2014

(86) PCT No.: PCT/EP2014/072086
§ 371 (c)(1),
(2) Date: Jun. 8, 2016

(87) PCT Pub. No.: WO2015/086197
PCT Pub. Date: Jun. 18, 2015

(65) Prior Publication Data
US 2017/0006203 A1    Jan. 5, 2017

(30) Foreign Application Priority Data
Dec. 12, 2013 (DE) .................. 10 2013 021 518

(51) Int. Cl.
*H04N 5/225* (2006.01)
*H01R 12/72* (2011.01)
(Continued)

(52) U.S. Cl.
CPC .......... *H04N 5/2257* (2013.01); *B60R 11/04* (2013.01); *H01R 12/724* (2013.01); *H01R 12/91* (2013.01); *H01R 2201/26* (2013.01)

(58) Field of Classification Search
CPC .......... B60R 11/04; B60R 2001/1253; H04N 5/2251–5/2257; G02B 7/08; G02B 7/04;
(Continued)

(56) References Cited

U.S. PATENT DOCUMENTS 6,151,065 A * 11/2000 Steed ............... B60Q 1/0023
348/148
7,480,149 B2 * 1/2009 DeWard ............ B60R 11/04
340/438
(Continued)

FOREIGN PATENT DOCUMENTS

CN   202 205 972 U   4/2012
DE   39 03 839 A1    8/1989
(Continued)

OTHER PUBLICATIONS

International Search Report issued in PCT/EP2014/072086 dated Feb. 5, 2015 (2 pages).
(Continued)

*Primary Examiner* — Michael Osinski
(74) *Attorney, Agent, or Firm* — Osha Liang LLP

(57) ABSTRACT

The invention relates to an electronic apparatus (1) for a camera system of a motor vehicle, including a housing (2), including a circuit board (15) disposed in the housing (2), and including an electrical connecting unit (7) for electrically connecting the electronic apparatus (1) to an external apparatus, wherein the connecting unit (7) has a base body (12) and a plurality of electrical connecting elements (14) projecting from the base body (12) and electrically connected to the circuit board (15), and wherein the base body (12) has a connecting area (13) disposed outside of the housing (2) for connecting a cable, wherein the base body
(Continued)

Figure 1:
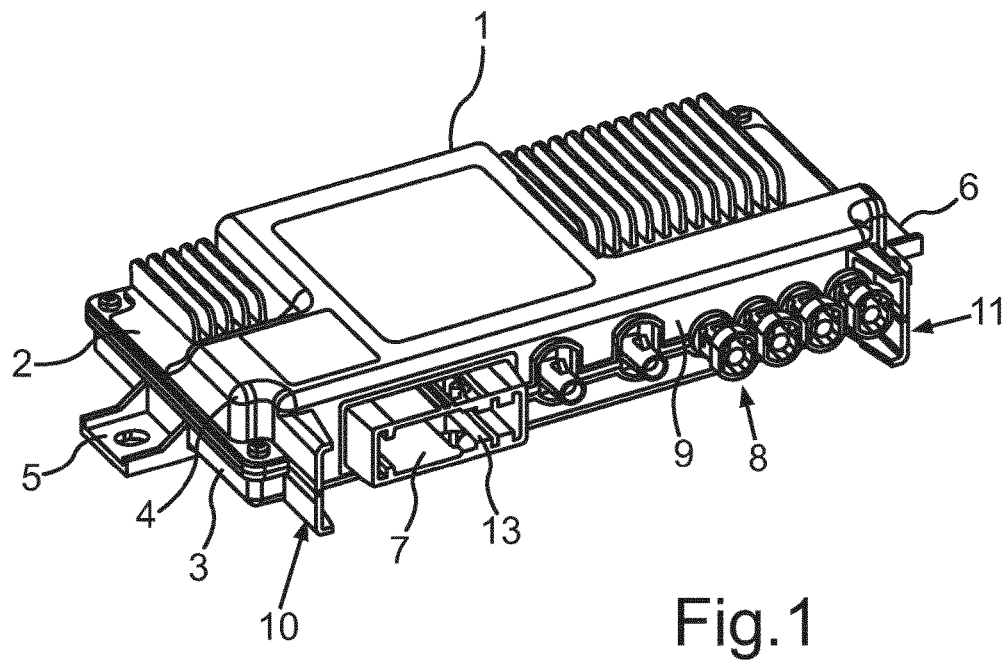

(12) of the connecting unit (7) is supported on the housing (2) with a clearance (26) at least in one translational degree of freedom.

10 Claims, 5 Drawing Sheets

(51) Int. Cl.
  *H01R 12/91* (2011.01)
  *B60R 11/04* (2006.01)
(58) Field of Classification Search
  CPC .......... G02B 7/02; G02B 7/026; G03B 17/00; G03B 17/02
  See application file for complete search history.

(56) References Cited

U.S. PATENT DOCUMENTS

| | | | | |
|---|---|---|---|---|
| 8,821,174 | B2* | 9/2014 | Kimura | H01R 13/6315 |
| | | | | 439/248 |
| 8,897,633 | B2* | 11/2014 | Okuda | G03B 17/565 |
| | | | | 396/25 |
| 9,106,817 | B2* | 8/2015 | Nagasawa | H04N 5/2252 |
| 9,193,308 | B2* | 11/2015 | Okuda | B60R 11/04 |
| 9,560,255 | B2* | 1/2017 | Oh | H04N 5/2259 |
| 9,596,387 | B2* | 3/2017 | Achenbach | H04N 5/2251 |
| 9,621,017 | B2* | 4/2017 | Lee | H02K 41/0356 |
| 9,628,680 | B2* | 4/2017 | Takeda | H04N 5/2252 |
| 9,635,229 | B2* | 4/2017 | Wato | H04N 5/2254 |
| 2002/0126457 | A1* | 9/2002 | Kameyama | H01R 13/6658 |
| | | | | 361/728 |
| 2004/0027458 | A1* | 2/2004 | Takada | H04N 5/2253 |
| | | | | 348/207.99 |
| 2005/0276599 | A1* | 12/2005 | Kajino | H04N 5/2252 |
| | | | | 396/419 |
| 2007/0195512 | A1* | 8/2007 | Konno | H01R 23/6873 |
| | | | | 361/771 |
| 2009/0046150 | A1* | 2/2009 | Hayakawa | H04N 5/2254 |
| | | | | 348/148 |
| 2009/0122430 | A1* | 5/2009 | DeWard | B60R 11/04 |
| | | | | 359/871 |
| 2009/0252489 | A1* | 10/2009 | Huang | G03B 17/00 |
| | | | | 396/529 |
| 2010/0055951 | A1 | 3/2010 | Matsuzawa et al. | |
| 2010/0091439 | A1* | 4/2010 | Horii | H04M 1/0249 |
| | | | | 361/679.01 |
| 2012/0026330 | A1* | 2/2012 | Huelsen | B60R 1/00 |
| | | | | 348/148 |
| 2012/0155855 | A1* | 6/2012 | Okuda | B60R 11/04 |
| | | | | 396/535 |
| 2012/0207461 | A1* | 8/2012 | Okuda | B60R 11/04 |
| | | | | 396/419 |
| 2013/0017729 | A1* | 1/2013 | Kimura | H01R 13/6315 |
| | | | | 439/626 |
| 2014/0016919 | A1* | 1/2014 | Okuda | G03B 17/565 |
| | | | | 396/25 |
| 2014/0022449 | A1* | 1/2014 | Nagasawa | H04N 5/2252 |
| | | | | 348/373 |
| 2014/0160284 | A1* | 6/2014 | Achenbach | H04N 5/2251 |
| | | | | 348/143 |
| 2015/0256729 | A1* | 9/2015 | Wato | H04N 5/2252 |
| | | | | 348/311 |
| 2016/0165125 | A1* | 6/2016 | Kim | G03B 3/10 |
| | | | | 348/345 |
| 2017/0099417 | A1* | 4/2017 | Oh | H04N 5/2253 |
| 2017/0223240 | A1* | 8/2017 | Wato | H04N 5/2252 |
| | | | | 396/428 |

FOREIGN PATENT DOCUMENTS

| | | |
|---|---|---|
| DE | 39 23 351 A1 | 1/1990 |
| DE | 689 11 661 T2 | 5/1994 |
| DE | 10 2009 018 517 A1 | 11/2010 |
| DE | 10 2010 023293 A1 | 12/2011 |

OTHER PUBLICATIONS

Written Opinion of the International Searching Authority issued in PCT/EP2014/072086 dated Feb. 5, 2015 (5 pages).
German Search Report issued in DE 10 2013 021 518.8, dated Aug. 12, 2014 (7 pages).

* cited by examiner

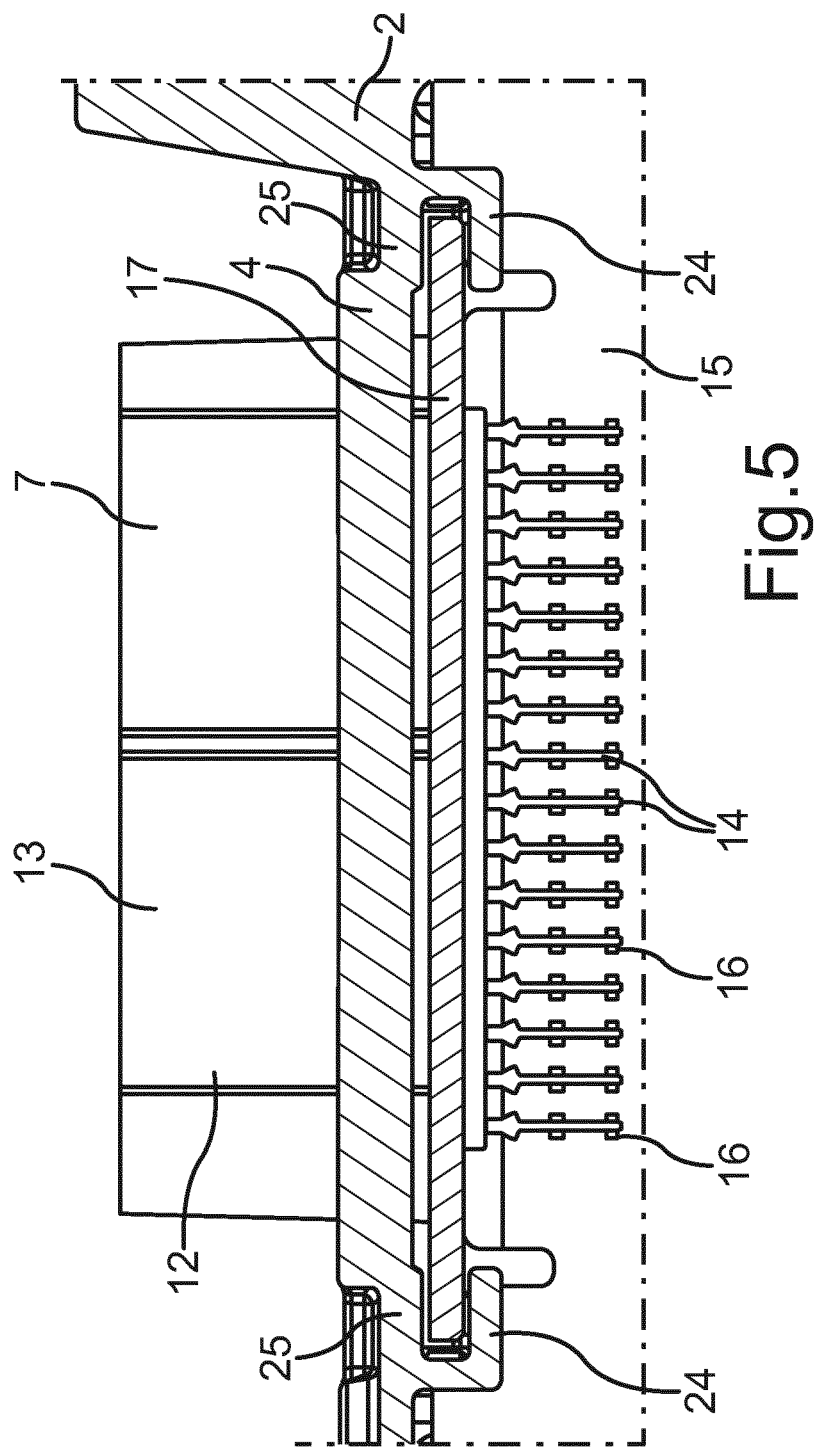

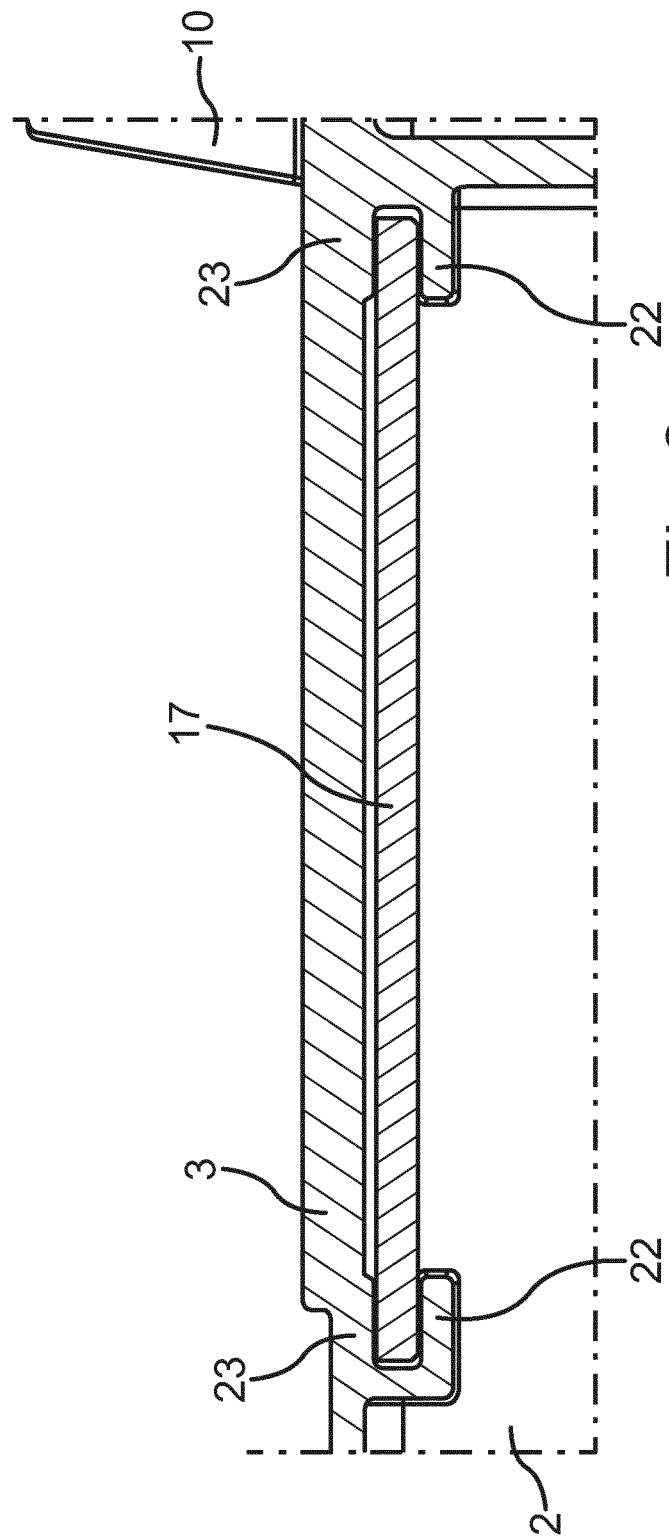

ELECTRONIC APPARATUS WITH AN IMPROVED BEARING FOR A CONNECTING UNIT, CAMERA SYSTEM FOR A MOTOR VEHICLE AND MOTOR VEHICLE

The invention relates to an electronic apparatus for a camera system of a motor vehicle, including a housing, including a circuit board disposed in the housing, and including an electrical connecting unit for electrically connecting the electronic apparatus to an external apparatus, wherein the connecting unit has a base body and a plurality of electrical connecting elements projecting from the base body and electrically connected to the circuit board, and wherein the base body has a connecting area disposed outside of the housing, which serves for connecting a cable. In addition, the invention relates to a camera system for a motor vehicle comprising such an electronic apparatus as well as to a motor vehicle with such a camera system.

Presently, the interest is in particular directed to a controller (Electronic Control Unit, ECU) of a camera system of a motor vehicle. Camera systems for motor vehicles are already prior art and can include multiple cameras disposed distributed on the motor vehicle and capturing the environment around the motor vehicle. Usually, the cameras are controlled by means of a controller processing the captured images. In order to be able to provide a plurality of different functionalities in the motor vehicle based on the images, the today's controllers are equipped with digital signal processors and microcontrollers of great computational power. These components are usually disposed on a circuit board (PCB). In order to allow connection between the controller on the one hand and the cameras or other vehicle components on the other hand, a connecting unit in the form of a socket is employed in the controller, which is electrically connected to the circuit board within the controller for example via a plurality of electrical contact elements. This connecting unit is therefore connected to the circuit board and thus for example to the mentioned signal processor on the one hand and also has a connecting area on the other hand, which is disposed outside of the housing and serves for connecting a cable, via which the controller is connected to the cameras or other vehicle components. This connecting area is formed in the form of a socket, into which a plug of the cable can be plugged. Other embodiments are also possible.

In the prior art, the connecting unit is connected to the circuit board via electrical connecting elements. These connecting elements thus serve for the electrical connection between the connecting unit and the circuit board. For the mechanical stability and attachment of the connecting unit, a separate fastener is employed, via which the connecting unit is mechanically fixed to the circuit board. The attachment of the fastener to the circuit board is effected with the aid of screws. Thus, the connecting unit is rigidly and fixedly connected to the circuit board. However, in some implementations of the controller, the employment of such a bow-shaped fastener is not possible due to installation space problems. If for example a plurality of electronic components is placed on the circuit board, thus, the attachment of an additional bow for screwing the connecting unit to the circuit board is no longer possible. However, if one would completely refrain from supporting the connecting unit, thus, the electrical connecting elements could not withstand the forces occurring in the operation, and break of the connecting elements could occur.

It is an object of the invention to demonstrate a solution, how in an electronic apparatus of the initially mentioned kind the connecting unit can be supported in the electronic apparatus such that less installation space is taken up on the one hand and damage to the connecting elements is also prevented on the other hand.

According to the invention, this object is solved by an apparatus, by a camera system as well as by a motor vehicle having the features according to the respective independent claims. Advantageous implementations of the invention are the subject matter of the dependent claims, of the description as well as of the figures.

An electronic apparatus according to the invention is conceived for installation in a camera system of a motor vehicle. The apparatus includes a housing, in which a circuit board is disposed. The apparatus additionally includes an electrical connecting unit, via which the electronic apparatus can be coupled to an external apparatus, for example at least one camera and/or a voltage source and/or a controller of the motor vehicle. The connecting unit has a base body and a plurality of electrical connecting elements projecting from the base body or protruding from the base body and electrically connected to the circuit board. The base body has a connecting area disposed outside of the housing and serving for connecting a cable. According to the invention, it is provided that the base body is supported on the housing with clearance at least in one translational degree of freedom.

Thus, according to the invention, a floating bearing is proposed for the attachment of the connecting unit to the housing. Such a bearing subject to clearance can be realized without additional installation space as well as without additional fasteners such that the required installation space is minimal. By the bearing subject to clearance and thus by the defined restriction of the movement of the connecting unit, destruction of the connecting elements with greater forces can additionally be prevented.

Thus, the base body of the connecting unit is supported on the housing subject to clearance at least in one translational degree of freedom. In an embodiment, it is provided that the base body is supported with clearance at least in two translational degrees of freedom. Furthermore, it can be provided that the base body is supported with clearance in three translational degrees of freedom. This means that the base body is supported on the housing subject to clearance in three orthogonal directions—for example in three directions of a Cartesian coordinate system.

Preferably, the base body of the connecting unit has a bearing element, which is supported with clearance in a bearing chamber formed in the housing. The floating bearing of the base body can therefore be realized independently of the circuit board itself. The forces applied to the connecting unit in the operation are therefore transmitted to the housing itself and not to the circuit board.

Preferably, the bearing chamber is bounded by walls, by which movement of the bearing element of the connecting unit is limited in defined manner within the bearing chamber. The bearing chamber can for example be formed such that the movement of the bearing element is kept within predetermined bounds by the walls of the bearing chamber, for example in a range of values from 1 mm to 5 mm. Destruction of the connecting elements can thus be reliably prevented.

It proves advantageous if the bearing element is formed in the form of a flange projecting to the outside from the base body. This flange can also be circumferentially formed such that the flange is constituted by a circumferential collar of the base body. By such a flange, the bearing subject to clearance can be realized without much constructional effort.

The flange can be disposed perpendicularly to the circuit board. This has the advantage that thus additional installation space over the circuit board is not taken up by the flange.

Correspondingly, the bearing chamber can be formed in the form of a groove, in which an edge region of the bearing element—in particular of the flange—is supported. This groove can be a circumferential slot formed in the housing, in particular perpendicularly to the circuit board. By providing such a groove, the movement of the bearing element can be kept within predetermined bounds without much constructional effort. In addition, the attachment of the connecting unit can therefore be performed without much effort by merely connecting the electrical connecting elements to the circuit board and inserting the bearing element into the groove.

In this respect, it has furthermore proven particularly advantageous if the housing has a bottom and a separate top. The circuit board can be attached to the bottom, while the top can serve as a lid for covering or closing the bottom. The bearing chamber can have a first area formed on the bottom and a second area formed on the top. The effort in assembly of the connecting unit is therefore minimal, because only the connecting elements have to be connected to the circuit board and the bearing element of the connecting unit has to be inserted into the first area of the bearing chamber. If the bottom is then covered by the top, the upper area of the bearing element automatically gets into the second area of the bearing chamber. Further measures for attaching the connecting unit are not required and preferably also not provided.

Preferably, the connecting elements are formed as press-fit connectors, which are each press-fitted into a corresponding recess (for example bore) of the circuit board. Thus, a force- and form-fit connection arises, which also is able to withstand greater forces in the operation of the electronic apparatus. In addition, soldering of the connecting elements to the circuit board is therefore not required. It is only sufficient that the press-fit connectors are inserted into the corresponding recesses and thus fixed to the circuit board.

In an embodiment, the electronic apparatus is a controller serving for controlling at least one camera of the camera system and/or for processing images of the camera.

However, alternatively, it can be provided that the electronic apparatus is a camera of the camera system.

A camera system according to the invention for a motor vehicle includes at least one camera for providing images of an environmental region of the motor vehicle as well as a controller for processing the images, wherein the camera and/or the controller is formed as an electronic apparatus according to the invention.

A motor vehicle according to the invention, in particular a passenger car, includes a camera system according to the invention.

The preferred embodiments presented with respect to the electronic apparatus according to the invention and the advantages thereof correspondingly apply to the camera system according to the invention as well as to the motor vehicle according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on a preferred embodiment as well as with reference to the attached drawings.

Figure 2:
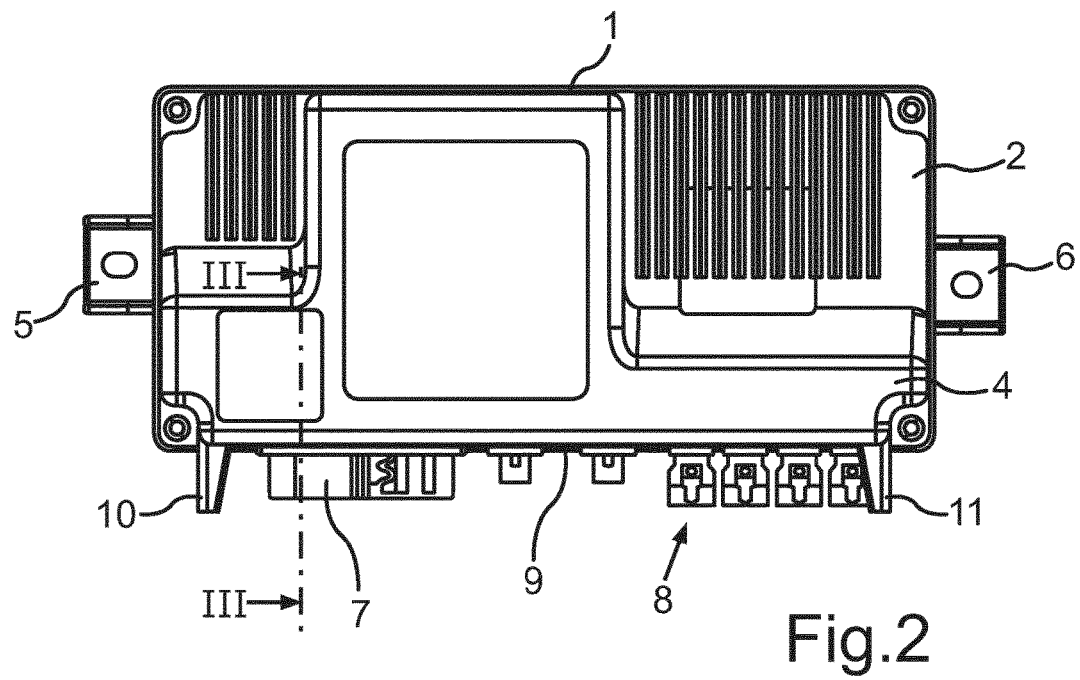
Figure 3:
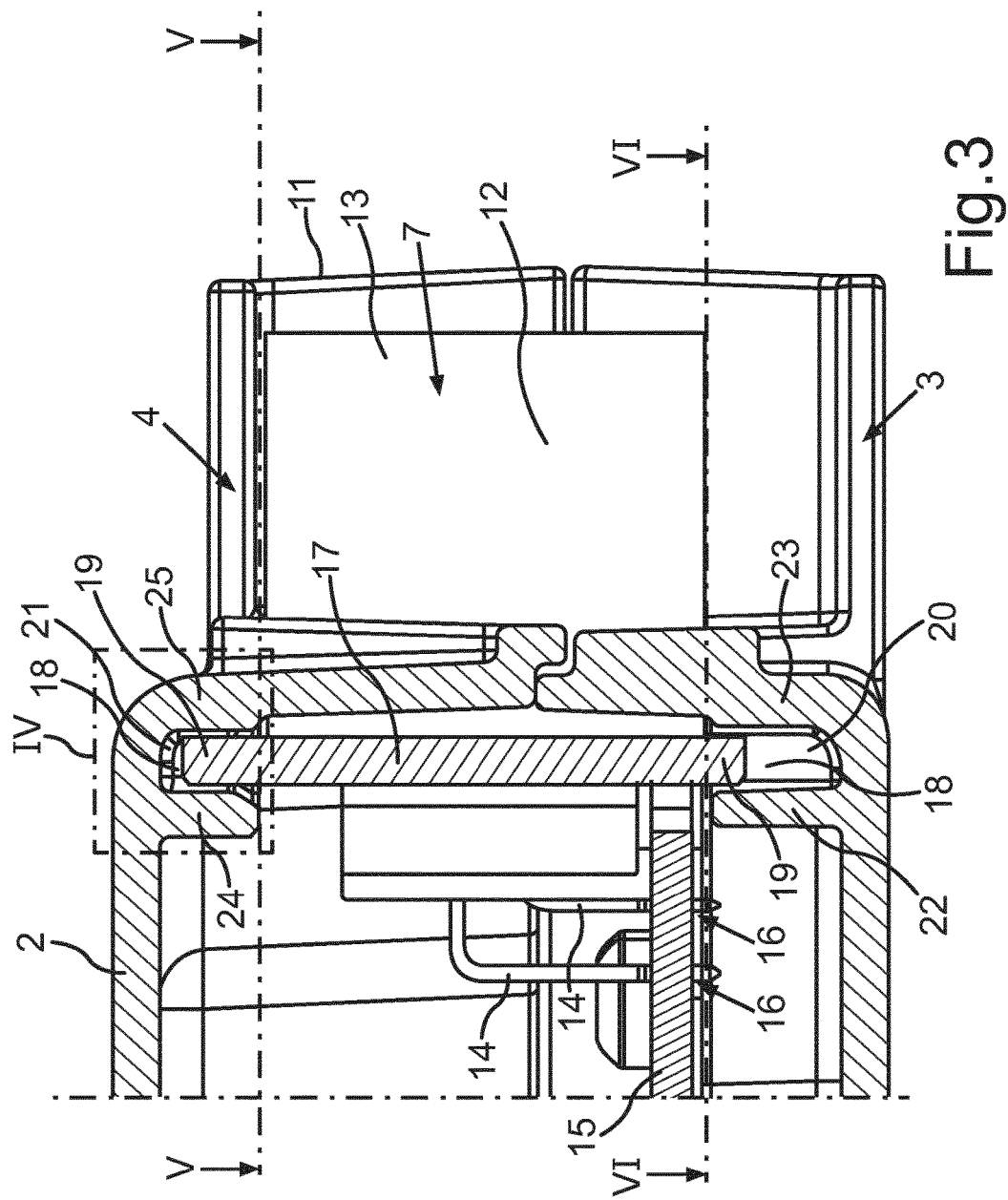
Figure 4:
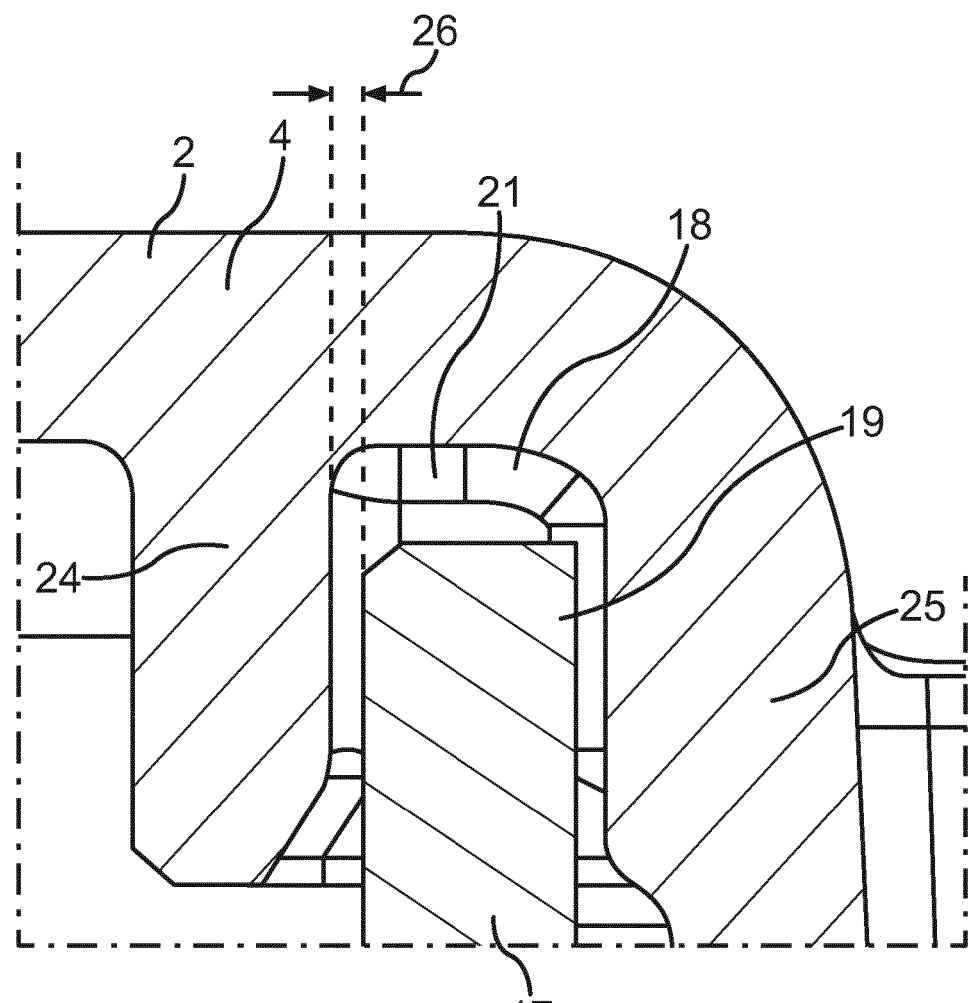

There show:

FIG. 1 in schematic and perspective illustration an electronic apparatus according to an embodiment of the invention;

FIG. 2 in schematic illustration a plan view of the electronic apparatus according to FIG. 1;

FIG. 3 in schematic illustration a sectional view through an area of the apparatus along a sectional line III-III indicated in FIG. 2;

FIG. 4 in schematic illustration an enlarged area of FIG. 3;

FIG. 5 in schematic illustration a plan view of a circuit board and a connecting unit supported in a bearing chamber; and FIG. 6 in schematic illustration a plan view of a bottom of the housing and an area of a bearing element.

In FIG. 1, an electronic apparatus 1 according to an embodiment of the invention is shown in schematic illustration. In the embodiment, the apparatus 1 is a controller (ECU), which serves for controlling cameras of a camera system of a motor vehicle. The controller 1 also serves for processing images of the cameras. For example, the controller 1 can be connected to a display and then serves for controlling the display. The controller 1 can present various views on the display, which are based on the images of the cameras.

The apparatus 1 has a housing 2, which is composed of a bottom 3 and a top 4 in the embodiment. Fastening ears 5, 6 are disposed on the bottom 3, which are formed for attaching the apparatus 1 to a vehicle component. For example, the attachment can be performed by means of screws.

In addition, the apparatus 1 has a connecting unit 7, which is formed for electrically connecting the apparatus 1 to an external apparatus, for example a camera and/or another controller and/or a supply voltage and/or the mentioned display. Further interfaces 8 are also provided. Both the connecting unit 7 and the further interfaces 8 are disposed on a common side 9 of the housing 2. Two projections 10, 11 project from this side 9 in respective edge regions, which serve for protection of the connecting unit 7 and the further interfaces 8. The projections 10, 11 ensure secure protection of the connecting unit 7 in particular during the production of the apparatus 1. For example, if the apparatus 1 drops down with the side 9, the forces are absorbed by the projections 10, 11 and thus by the housing 2 and thus do not act on the connecting unit 7. Namely, these projections 10, 11 reach further than the connecting unit 7.

In FIG. 2, a plan view of the apparatus 1 is shown. As is apparent from FIG. 2, the projections 10, 11 overall reach further than the connecting unit 7 and the further interfaces 8 such that force is not applied to the connecting unit 7 or the interfaces 8 upon supporting the apparatus 1 via its side 9, but this force is applied to the projections 10, 11 and thus to the housing 2.

In FIG. 3, a sectional view along a sectional line III-III shown in FIG. 2 is illustrated. In FIG. 3, additionally, the projection 11 behind the connecting unit 7 is illustrated. The connecting unit 7 includes a base body 12 for example made of plastic. The base body 12 includes a connecting area 13, which is formed in the form of a socket (cf. FIG. 1) in the embodiment, which serves for receiving a plug of a cable (not illustrated). On the other side, a plurality of electrical connecting elements 14 protrudes from the base body 12, which are electrically connected to a circuit board 15 and thus connect the connecting unit 7 to electronic components, which are disposed on the circuit board 15. The connecting elements 14 are configured as press-fit connectors in the embodiment, which are press-fitted into corresponding recesses 16 in the circuit board 15. Therein, the connecting elements 14 are electrically coupled to conducting paths disposed on the circuit board 15.

In addition, the base body 12 has a bearing element 17, which is supported in a bearing chamber 18 formed in the housing 2. Here, the bearing element 17 is configured in the form of a circumferential flange and thus plate-shaped, which is disposed perpendicularly to the circuit board 15. Correspondingly, the bearing chamber 18 is configured in the form of a circumferential groove, in which an edge region 19 of the bearing element 17 is disposed.

The bearing chamber 18 is constituted by two areas, namely a first area 20 formed on the bottom 3 of the housing 2 as well as a second area 21 formed on the top 4 of the housing 2. Therein, the circuit board 15 is attached to the bottom 3.

The support of the bearing element 17 within the bearing chamber 18 is not rigid, but the bearing element 17 is supported with a clearance and thus movably within the bearing chamber 18. Therein, the bearing chamber 18 is bounded by walls 22, 23 and 24, 25. The clearance is configured such that the movement of the bearing element 17 within the bearing chamber 18 is limited in defined manner by the walls 22, 23 and 24, 25. The distance between the bearing element 17 on the one hand and the walls 22, 23, 24, 25 of the bearing chamber 18 on the other hand can for example be in a range of values from 1 mm to 5 mm in a rest position of the bearing element 17.

FIG. 4 shows an enlarged area IV from FIG. 3. As is apparent from FIG. 4, the bearing element 17 is supported within the bearing chamber 18 with a clearance 26. Therein, this clearance exists in all of the three translational degrees of freedom such that movement of the bearing element 17 is basically possible in all of the three directions within predetermined bounds. The rest position of the bearing element 17 shown in FIGS. 3 and 4 is maintained by the stiff configuration of the connecting elements 14 until greater forces are applied to the connecting unit 7.

In FIG. 5, a plan view of the connecting unit 7 with the bearing element 17 as well as a sectional view of the top 4 of the housing 2 are shown. As is apparent from FIG. 5, the bearing element 17 is a circumferential flange, which is fully circumferentially disposed within the bearing chamber 18. This is also apparent from FIG. 6, in which a plan view of the bottom as well as a sectional view of the bearing element 17 below the circuit board 15 (not illustrated in FIG. 6) are shown.

The invention claimed is:

1. An electronic apparatus for a camera system of a motor vehicle, comprising:
   a housing, comprising a circuit board disposed in the housing; and
   an electrical connecting unit for electrically connecting the electronic apparatus to an external apparatus, wherein the connecting unit has a base body and a plurality of electrical connecting elements, which project from the base body and are electrically connected to the circuit board, and wherein the base body has a connecting area disposed outside of the housing for connecting a cable,
   wherein the base body of the connecting unit is supported on the housing with a clearance at least in one translational degree of freedom,
   wherein the base body has a bearing element, which is supported with a clearance in a bearing chamber formed in the housing,
   wherein the housing comprises a bottom, to which the circuit board is attached, and a top connected to the bottom, and
   wherein the bearing chamber has a first area formed on the bottom and a second area formed on the top.

2. The apparatus according to claim 1, wherein the base body of the connecting unit is supported on the housing with a clearance at least in two translational degrees of freedom.

3. The apparatus according to claim 1, wherein a movement of the bearing element within the bearing chamber is limited in defined manner by walls of the bearing chamber.

4. The apparatus according to claim 1, wherein the bearing element is formed in the form of a circumferential flange.

5. The apparatus according to claim 4, wherein the flange is disposed perpendicularly to the circuit board.

6. The apparatus according to claim 1, wherein the bearing chamber is formed in the form of a groove, in which an edge region of the bearing element is supported.

7. The apparatus according to claim 1, wherein the connecting elements are formed as press-fit connectors, which are each press-fitted into a corresponding recess of the circuit board.

8. The apparatus according to claim 1, wherein the apparatus is a controller for controlling at least one camera of the camera system and/or for processing images of the camera.

9. A camera system for a motor vehicle, comprising:
   at least one camera for providing images; and
   a controller for processing the images,
   wherein at least one of the components of camera and/or controller is formed as an electronic apparatus according to claim 1.

10. A motor vehicle with a camera system according to claim 9.

* * * * *